Aug. 13, 1940.   H. G. FRANK   2,211,264
AUTOMOBILE SIGNALING DEVICE
Original Filed Oct. 4, 1937
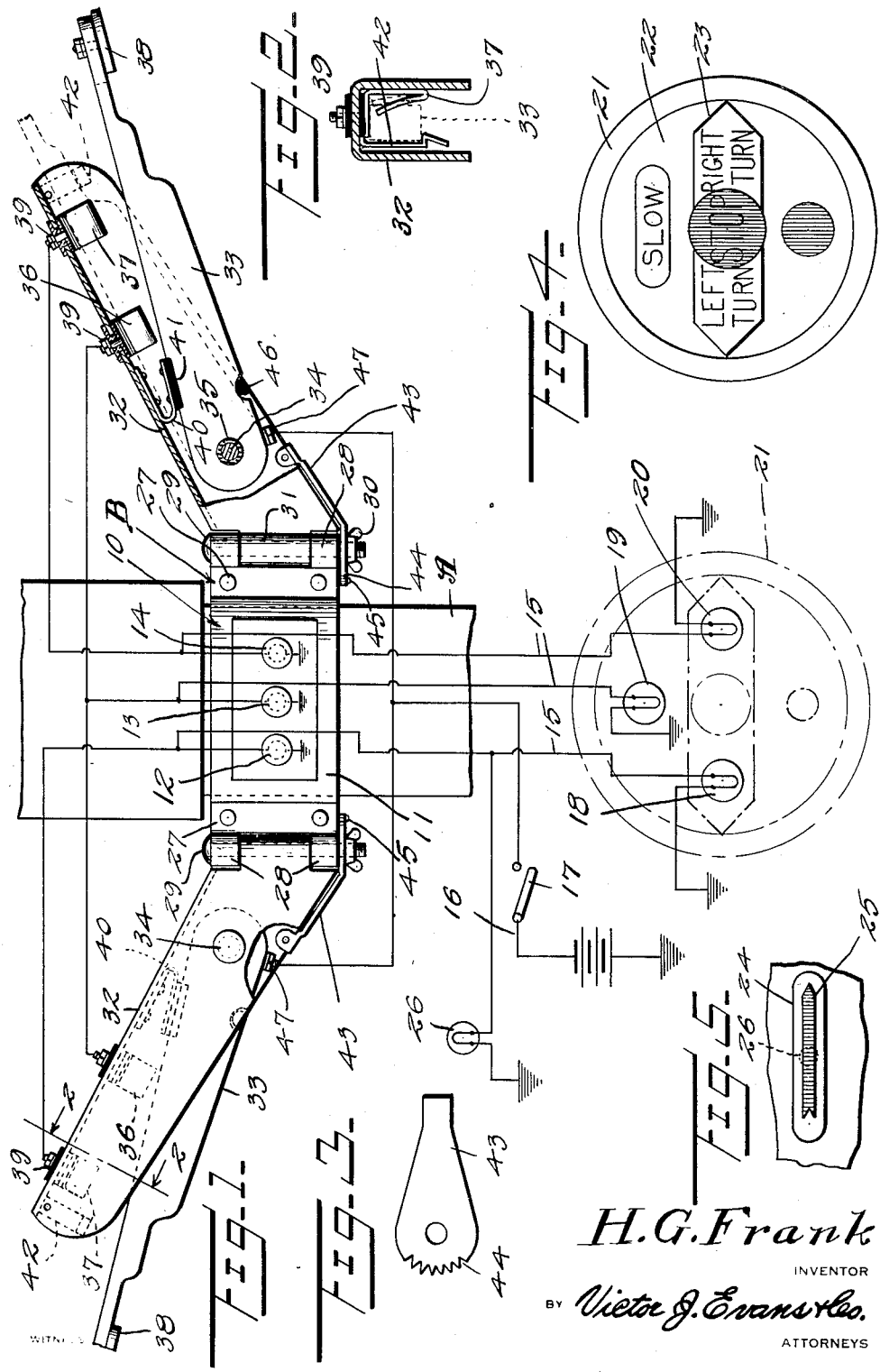
H.G.Frank
INVENTOR
BY Victor J. Evans & Co.
ATTORNEYS Patented Aug. 13, 1940

2,211,264

UNITED STATES PATENT OFFICE 2,211,264

AUTOMOBILE SIGNALING DEVICE

Harlow G. Frank, Wolf Point, Mont.

Application October 4, 1937, Serial No. 167,286
Renewed April 14, 1939

10 Claims. (Cl. 200—59)

The invention relates to an electric signaling system and more especially to an automobile directional signaling device.

The primary object of the invention is the provision of a device of this character, wherein hand signaling by operators of automobiles, such as trucks, passenger vehicles, trailers or other motor propelled vehicles using the highways will be eliminated in that a visible signal will indicate the course of a vehicle when in motion, the device being of novel construction and is convenient and handy for operation by the driver of the vehicle.

Another object of the invention is the provision of a device of this character, wherein the switches arranged in the electric system are of the knife blade type and are manually controlled, these being arranged for proper positioning thereof convenient to the operator of the vehicle, being preferably arranged on the steering shaft column interiorly of the vehicle and in association are pilot lamps, these enabling the operator of the vehicle to determine accuracy in the signaling operation of the device.

A further object of the invention is the provision of a device of this character, wherein the pilot lamps and signaling lamps are located conveniently so as to make visible to the operator of the vehicle and traffic the required signals in the conduct of the vehicle when in motion.

A still further object of the invention is the provision of a device of this character, which is simple in its make-up, thoroughly reliable and effective in operation, readily and easily handled, assuring visible signals as to the directional course of the vehicle with which the same is associated and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation partly in section of the device constructed in accordance with the invention and shown in the diagrammatic layout of the electric system for the operation thereof.

Figure 2 is a sectional view on the line 2—2 of Figure 1 looking in the direction of the arrows.

Figure 3 is a bottom plan view of one of the latches in association with the switch arrangement of the device.

Figure 4 is an elevation of a signal lamp house employed in the device.

Figure 5 is a fragmentary elevation of another lamp house in association with the device.

Similar reference characters indicate corresponding parts throughout the several views in the drawing.

Referring to the drawing in detail, A designates generally a portion of a steering post column as employed in a motor vehicle being of standard construction while B designates generally the signaling device constituting the present invention and hereinafter fully described.

The signaling device B comprises a bracket 10 formed with a lamp house 11 in which is arranged a group of pilot lamps 12, 13 and 14, respectively, arranged in electric circuits 15, these being in parallel in a main circuit 16 of a source of electrical current supply, which circuit 16 has therein a hand switch 17 for the opening and closing of the same. The switch 17 is arranged conveniently within the vehicle with which the device is associated and such circuit is preferably a part of the electrical wiring system of the vehicle.

These circuits 15 are common to a group of lamps 18, 19 and 20, respectively, arranged within a lamp house 21 suitably mounted exteriorly on the vehicle for visibility and its illuminating panel 22 has indicia "Slow, Left turn, Stop, and Right turn," respectively, a double arrow 23 being related to left turn, stop and right turn and identifies the directional turn right or left on illumination of the lamps 18 and 20, respectively, while the lamp 19 is related to the indicia "Slow." It is preferable to have the lamp house 21 located aft of the vehicle while fore of the vehicle and exteriorly thereof is a lamp house 24, its illuminating panel carrying an arrow indication 25 related to a lamp 26 within said lamp house 24 and this lamp 26 is arranged in a circuit parallel with the circuit 15, the arrow indication identifying a left hand turn.

The bracket 10, which may be preferably in the form of a clamping collar of a separable or split type for embracing the post A, has at diametrically opposite sides thereof laterally directed reversely extending ears 27, these being formed with pintle eyes 28 accommodating pivot bolts 29 provided with winged nuts 30. The bolts 29 pass through pintle sleeves 31 formed on adjustable and swingable knife switch guard arms 32, these swinging in a horizontal path and are open at their bottom and outer end edges in that the same are of substantially inverted U shape in cross section. Fitted for vertical swing within the guard arms 32 are blade switches 33, each pivoted at 34 for vertical swinging movement and insulated at 35 from the said companion guard arms, the guard arms 32 being fitted with double switch contacts 36 and 37, respectively. The contacts 36 are included in the circuit to the lamps 13 and 19, respectively, while one of the contacts 37 is common to the circuit to the lamps 14 and 20, respectively, and the other contact 37 is included in the circuit to the lamps 12 and 18, respectively, these contacts being coactive with the blade switches 33, which are hand operated and are provided with push button outer end terminals 38 accessible to and operable by the operator of a vehicle. The contacts 36 and 37 are suitably insulated from the arms 32 as at 39.

Fitted within the arms 32 are leaf springs 40, these being insulated at 41 from the switches 33 and are active thereon to normally hold the same and out of engagement with the contacts 36 and 37.

Fitted within the arms 32 next to the outer open ends thereof are spring clipped keepers or latches 42 which are engageable with the switches 33 when in closing position in engagement with the contacts 36 and 37 and release the said switches 33 when downward pressure is exerted thereon at the terminals 38 thereof.

Carried by the arms 32 next to the pivots 29 are ratchet acting resilient catches 43 embracing the pivots 29 and are formed with the arcuate toothed peripheries 44 engageable with coacting stops 45 on the bracket 10 and such catches are acted upon by the nuts 30 and hold the arms 32 swingably adjustable and in a fixed position on the tightening of the nuts 30 upon the pivots 39. In this manner the arms 32 with the switches 33 therein may be set to the desired nicety of the operator of the vehicle for convenience in the handling of the switches in the operation of the device.

The arms 32 carry stops 46 insulated from the same and in the path of movement of the switches 33 to limit the opening movement thereof. The switches 33 are in electrical connection at 47 with the circuits 15 so that when the switches 33 engage the contacts 36 and 37 selected lamp illumination electrically will be had.

In the use of the device hand signaling by operators of motor vehicles will be eliminated and directional electric visible signaling had in substitute therefor.

What is claimed is:

1. A signal device switch mechanism for a motor vehicle having a steering column comprising a fitting for said column and having an upstanding pintle, a guard arm horizontally swingable on said pintle, a hand-operated switch blade working within the arm, means associated with the arm for adjustably latching the same in different selected positions throughout the major extent of the horizontal swing thereof, and latching means within the arm for releasably latching the blade when moved into said arm.

2. A signal device switch mechanism for a motor vehicle having a steering column comprising a fitting for said column and having an upstanding pintle, a guard arm horizontally swingable on said pintle, a hand-operated switch blade working within the arm, means associated with the arm for adjustably latching the same in different selected positions throughout the major extent of the horizontal swing thereof, latching means within the arm for releasably latching the blade when moved into said arm, and means on the pintle and active upon the first-named means for operating the same.

3. A signal device switch mechanism for a motor vehicle having a steering column comprising a fitting for said column and having an upstanding pintle, a guard arm horizontally swingable on said pintle, a hand-operated switch blade working within the arm, means associated with the arm for adjustably latching the same in different selected positions throughout the major extent of the horizontal swing thereof, latching means within the arm for releasably latching the blade when moved into said arm, means on the pintle and active upon the first-named means for operating the same, and means within the arm and active upon the blade for positioning the same outwardly of said arm.

4. A signal device switch mechanism for a motor vehicle having a steering column comprising a fitting for said column and having an upstanding pintle, a guard arm horizontally swingable on said pintle, a hand-operated switch blade working within the arm, means associated with the arm for adjustably latching the same in different selected positions throughout the major extent of the horizontal swing thereof, latching means within the arm for releasably latching the blade when moved into said arm, means on the pintle and active upon the first-named means for operating the same, means within the arm and active upon the blade for positioning the same outwardly of said arm, and means on the arm and in the path of the blade for limiting the outward movement of said blade from within the arm.

5. A signal device switch mechanism for a motor vehicle having a steering column, a bracket on said column and having spaced laterally extending pintle eyes, a nut-carrying pintle fitting said eyes, an inverted substantially U-shaped arm having a pintle sleeve engaged with the pintle for the swinging of said arm and the disposition thereof at an angle to the column, a switch blade pivoted within the said arm and swingable into the same, an adjustable latching device carried by the arm and engaged with the pintle for operation by its nut and latching the arm in an adjusted position in the direction of the horizontal swing thereof, and means within the arm and engageable with the blade for releasably latching the same when within the said arm.

6. A signal device switch mechanism for a motor vehicle having a steering column, a bracket on said column and having spaced laterally extending pintle eyes, a nut-carrying pintle fitting said eyes, an inverted substantially U-shaped arm having a pintle sleeve engaged with the pintle for the swinging of said arm and the disposition thereof at an angle to the column, a switch blade pivoted within the said arm and swingable into the same, an adjustable latching device carried by the arm and engaged with the pintle for operation by its nut and latching the arm in an adjusted position in the direction of the horizontal swing thereof, means within the arm and engageable with the blade for releasably latching the same when within the said arm, and means active upon the blade for moving the same to a position normally outwardly of said arm.

7. A signal device switch mechanism for a motor vehicle having a steering column, a bracket on said column and having spaced laterally extending pintle eyes, a nut-carrying pintle fitting said eyes, an inverted substantially U-shaped arm having a pintle sleeve engaged with the pintle for the swinging of said arm and the disposition thereof at an angle to the column, a switch blade pivoted within the said arm and swingable into the same, an adjustable latching device carried by the arm and engaged with the pintle for operation by its nut and latching the arm in an adjusted position in the direction of the horizontal swing thereof, means within the arm and engageable with the blade for releasably latching the same when within the said arm, means active upon the blade for moving the same to a position normally outwardly of said arm, and an extension on said blade and having a finger-engaging tip located beyond said arm.

8. A signal device switch mechanism for a motor vehicle having a steering column, comprising a fitting for said column, hinge means carried by said fitting on opposed sides of said column, guard arms horizontally swingable on said hinge means, a hand operated switch blade pivotally supported within each arm, and circuit controlling contacts carried by said guard arms adapted to be closed by said switch blade for completing a circuit to a signal.

9. A signal device switch mechanism for a motor vehicle having a steering column, comprising a fitting for said column and having an upstanding pintle, a guard arm horizontally swingable on said pintle, a hand operated switch blade working within the arm, circuit controlling contacts carried by said guard arm adapted to be closed by said switch blade for completing a circuit to a signal, and means associated with the arm for adjustably latching the same in different selected positions.

10. A signal device switch mechanism for a motor vehicle having a steering column, comprising a fitting for said column, hinge means carried by said fitting on opposed sides of said column, guard arms horizontally swingable on said hinge means, a hand operated switch blade pivotally supported within each arm, circuit controlling contacts carried by said guard arms adapted to be closed by said switch blade for completing a circuit to a signal, and means associated with said arms for adjustably latching the same in different selected positions.

HARLOW G. FRANK.